United States Patent [19]

Sales

[11] Patent Number: 5,169,888
[45] Date of Patent: Dec. 8, 1992

[54] DISPERSION COMPOSITION AND METHOD FOR MAKING AND USING SAME

[75] Inventor: Allen A. Sales, Marietta, Ga.

[73] Assignee: Amoco Corporation, Chicago, Ill.

[21] Appl. No.: 801,016

[22] Filed: Dec. 2, 1991

Related U.S. Application Data

[63] Continuation of Ser. No. 544,241, Jun. 26, 1990, abandoned, which is a continuation of Ser. No. 364,602, Jun. 9, 1989, abandoned.

[51] Int. Cl.$^5$ ................................................ C08K 5/54
[52] U.S. Cl. .................................. 524/267; 524/269; 524/506; 524/507
[58] Field of Search ................ 524/269, 267, 507, 506

[56] References Cited

U.S. PATENT DOCUMENTS 4,598,120  7/1986  Thoma et al. ....................... 524/591

OTHER PUBLICATIONS

Eastman Chemicals, Pub. No. GN 363 Chlorinated Polyolefins CP-515-2, Feb. 1985.

*Primary Examiner*—Paul R. Michl
*Assistant Examiner*—John J. Guarriello
*Attorney, Agent, or Firm*—Stephen L. Hensley; Robert J. Wagner

[57] ABSTRACT

Aqueous dispersion compositions comprise a binder component comprising a film-forming, water-dispersible, carboxyl group-containing elastomeric polymer composition, a thickener component, a chlorinated polyolefin component, and a polyorganosiloxane component dispersed in an aqueous liquid. Such compositions additionally comprising a crosslinking agent and, optionally, colorant composition are used for coating and printing substrates.

33 Claims, No Drawings

DISPERSION COMPOSITION AND METHOD FOR MAKING AND USING SAME

This is a continuation of application Ser. No. 07/544,241, filed Jun. 26, 1990 which in turn is a continuation of application Ser. No. 364,602 filed Jun. 9, 1989 both, now abandoned.

FIELD OF THE INVENTION

This invention relates to dispersion compositions comprising a water-dispersible binder component comprising a film-forming, water-dispersible, carboxyl group-containing, elastomeric polymer composition; a thickener component; a chlorinated polyolefin component; a polyorganosiloxane component; and water. The invention also relates to a method for preparing such compositions and to coating and printing of substrates therewith.

BACKGROUND OF THE INVENTION AND THE PRIOR ART

U.S. Pat. No. 4,598,120, issued Jul. 1, 1986, to Thoma et al., discloses aqueous dispersion compositions useful as spreadable coating or printing pastes. The compositions contain an aqueous dispersion of a polyurethane or mixture thereof with an aqueous dispersion of a poly(meth)acrylate; a carboxyl group-containing, aqueous thickener polymer solution; a self-crosslinking polyorganosiloxane mixture comprising a polysiloxane with SiH groups and a polysiloxane with Si-vinyl groups; and a crosslinking agent for the polyurethane or polyurethane-poly(meth)acrylate mixture and thickener. Inclusion of pigments, antioxidants, flameproofing agents, antistatic agents, levelling aids, foam inhibitors, fungicides, bactericides, grip-improving agents and similar additives in the compositions also is disclosed as is application thereof to a textile substrate and heating to dry and react the compositions. Disclosed textile substrates are woven polyamide, polyester/cotton blend and polyester/rayon fabrics.

U.S. Pat. No. 3,360,494, issued Dec. 26, 1967, to Bolinger, is directed to textile sizing and adhesive compositions of improved adhesion to fibers such as wool, nylon, Dacron and cotton. The compositions comprise a water soluble, unsaturated monocarboxylic acid polymer and a water-soluble polyurethane carried in an aqueous medium, with about 1-5 parts polyurethane component being present per part of the carboxylic acid polymer. According to the patent, the presence of the carboxylic acid polymer improves adhesion. Use of such compositions with Dacron/cotton, Dacron/viscose and Dacron/wool blended yarns, wool-worsted, spun nylon, cotton and Dacron yarns and with waterproof paper strips is shown in the examples of Bolinger.

U.S. Pat. No. 3,529,990, issued Sep. 22, 1970, to Becker et al., discloses a finishing treatment for improving tear strength, crease-resistance, abrasion resistance and shape retention of various fabrics. The fabrics are treated with an aqueous bath containing polymers or copolymers of vinyl or divinyl monomers, including acrylic or methacrylic acid; a reaction product containing free isocyanate groups prepared from a polyisocyanate and an organic compound having at least two active hydrogen atoms selected from compounds having molecular weights of 500-10,000, organopolysiloxanes and combinations thereof; and water-soluble, carboxylic acid salts of Group I, II or VIII metals. The treated fabrics are subsequently treated with water or steam. Fabrics to be treated may be based on cotton, cellulose, wool, silk, polyamides, polyurethane, polyesters, polycarbonate, polyacrylonitrile, polypropylene and the like according to the patent. Use of polyacrylonitrile/wool blend fabrics, wool yarns, wool silver, polyacrylonitrile fibers, polyester/polyamide blend fabric, cotton fabric, knitted wool, wool georgette, wool cloque and wool fabric is disclosed in the examples.

Aqueous coating and printing compositions, however, are poorly suited for use with hydrophobic and inert substrates, such as polyolefins, due to poor adherence thereto, poor abrasion, weather and stain resistance and poor launderability.

Various organic solvent-based printing and coating compositions also are known. U.S. Pat. No. 3,547,870, issued Dec. 15, 1970, to Listner et al., is directed to organic solvent-based inks for application to plastic articles, including those of polypropylene, without surface treatments. The patent discloses inks with about 3-25 wt. % of a so-called "randiopropylene," defined as a diethyl ether-soluble polypropylene prepared by steric rearrangement of so-called "isotactic" polypropylene using a free radical initiator and a bromine compound; about 20-80 wt. % organic solvent, such as xylene, toluene, diethyl ether, methyl ethyl ketone, methyl isobutyl ketone, diisopropyl ether, orthodichlorobenzene, Solvesso 150, mixed aromatic solvent, hexane, heptane, decane and blends thereof; about 15-60 wt. % pigment; and, if needed, tackifiers, detackifiers, thickeners and other additives. U.S. Pat. No. 3,707,347, issued Dec. 26, 1972, to Mueller, discloses printing compositions for various plastics, including polyolefins, containing an organic colorant dispersed or dissolved in a dye carrier, such as a conventional lithographic varnish or an epoxy resin in a suitable organic solvent. Adjuvants such as thickening agents, e.g., silica and bentonite; anti-foaming agents, e.g. dimethylpolysiloxanes; and wetting agents, e.g. xylene, also may be included. Published European Patent Application No. 84108904.8, published Dec. 11, 1985, of Boston S.p.A., discloses writable adhesive tapes having a polyolefin substrate film coated on one side with an adhesive layer, such as acrylic, polyurethane or polyester copolymers or natural or synthetic rubbers or resins, and coated on the other side with a writable or printable anti-adhesive layer containing a chlorinated polyolefin and a polyaldehyde resin as film-forming adhesion promoters to the substrate and anti-adhesive and matting agents. The anti-adhesive layer also can contain a linear elastomeric polyurethane. Application of the anti-adhesive layer to the polyolefin substrate is conducted by coating the same with the anti-adhesive layer components dissolved or dispersed in a hydrocarbon solvent according to this publication. U.S. Pat. No. 4,608,415, issued Aug. 26, 1986, to Nakajima et al., discloses compositions useful as a vehicle in coating materials, printing inks or adhesives for plastics, especially polyolefin plastics, containing a chlorinated polyolefin, with less than 50 wt. % chlorine, reacted with a fatty acid-modified resin such as an alkyd, epoxy, phenol, polyamide resin or a resin based on a conjugated diene, triene or acid or a copolymerized oil. The chlorinated polyolefin is preferably dissolved in a solvent such as toluene or xylene prior to reaction. The compositions are said to be adherent to polyolefins and, as such, suitable vehicles for printing inks.

A disadvantage of organic solvent-based systems is the need for handling and disposal of the solvents in manufacture and use thereof.

Thus, there remains a need for improved coating and printing compositions and methods for preparing and using the same. It is an object of this invention to provide such compositions and methods for preparing and using the same. A further object of this invention is to provide improved dispersion compositions. A further object of the invention is to provide dispersion compositions suitable for use in printing and coating polyolefin substrates, including polypropylene fabrics. A further object of the invention is to provide improved printed or coated polyolefin substrates in which adhesion to the substrate, abrasion resistance, crock resistance and ability to withstand laundering are improved. Other objects of the invention will be apparent.

I have now found that the objects of this invention can be attained by providing dispersion compositions comprising a water-dispersible binder component comprising a film-forming, water-dispersible, carboxyl group-containing, elastomeric polymer composition; a thickener component; a chlorinated polyolefin component; a polyorganosiloxane component; and water. In another embodiment these objects are attained by providing such compositions additionally comprising a crosslinking agent. The latter compositions, when applied to substrates and cured, show excellent adhesion to the substrates. Such compositions also are suitable vehicles for colorants and, with addition thereto of colorant compositions, can be used for printing. Polyolefin fabrics printed or coated using such compositions have good abrasion resistance, resistance to crock, and retention of coatings and color after laundering. Advantageously, the present invention does not require modification of the substrate surfaces to achieve coloration and adhesion thereto. Further, the components of the invented compositions are readily available commercially and the compositions can be applied to substrates using equipment conventionally used in coating and printing operations.

DESCRIPTION OF THE INVENTION

Briefly, the dispersion compositions according to this invention comprise a binder component comprising at least one film-forming, water-dispersible, carboxyl group-containing, elastomeric polymer composition; a thickener component; a chlorinated polyolefin component; a polyorganosiloxane component; and water. These compositions also can contain a colorant composition dispersible therein. For use in printing and coating of substrates such compositions, with or without colorant compositions, additionally comprise a crosslinking agent.

Also provided according to this invention is a method for preparing such dispersion compositions comprising combining components comprising a water-dispersible binder component comprising a film-forming, water-dispersible, carboxyl group-containing, elastomeric polymer composition, a thickener component and water to form a thickened aqueous dispersion and adding to such dispersion components comprising a chlorinated polyolefin component, a polyorganosiloxane component, a crosslinking agent and, optionally, a colorant composition, under shear sufficient to form a substantially uniform aqueous dispersion composition.

For use in printing and coating, such compositions, with and without a colorant composition dispersed therein, respectively, are applied to a substrate and cured.

In greater detail, the binder component of the invented compositions comprises a film-forming, water-dispersible, carboxyl group-containing elastomeric polymer composition. The binder component is capable of forming a continuous coating or film of sufficient elasticity to resist cracking due to stretching or folding of substrates coated or printed using the invented compositions. Aqueous dispersions of the binder component are capable of dispersing the colorant compositions used according to the invention into discrete particles and, upon curing of the compositions, the colorant particles are bound in the continuous film or coating.

A preferred composition for use as a binder component of the invented compositions, and particularly those for use in coating or printing woven polyolefin substrates prepared from medium or high denier, continuous filament or spun yarns comprising polyolefin, e.g., polypropylene, is a water-dispersible, film-forming, elastomeric urethane polymer composition. Such compositions can be prepared by reaction of components comprising a glycol or polyol of polyester or polyether with diisocyanate by known methods. Urethane polymer compositions suitable as binder components in the invented compositions are water-dispersible in the sense that they are capable of forming an emulsion or dispersion that can be diluted with water. Aromatic and aliphatic urethane polymer compositions are suitable; however, the aliphatic compositions are preferred because they are less prone than the aromatic compositions to discolor due to exposure to ultraviolet light. Presence of residual hydroxyl or isocyanate groups in the polymers can cause undesirable reactions with water in the invented compositions; accordingly, urethane polymer compositions free or substantially free of unreacted isocyanate are preferred.

Examples of water-dispersible urethane polymer compositions are those known as Spensol ® water-dispersible polyurethane elastomers sold by Spencer Kellog, specific examples of which include those designated L44, L50, L51, L52, L54 and L56. Such compositions are described by the manufacturer as a dispersion of fully reacted thermoplastic urethane in a solvent mixture of water and N-methylpyrrolidone. Weight ratio of water to N-methyl pyrrolidone generally ranges from about 3:1 to about 10:1. Solids contents of such dispersions typically ranges from about 30 to about 40 wt. %. The urethane polymer may be present in such compositions as a tertiary amine salt, e.g. triethylamine salt, and minor amounts of free tertiary amine, for example up to about 5 wt. % based on solvent weight, may be present.

Such polymers and preparation thereof are disclosed in U.S. Pat. No. 4,203,883 to Hangauer, Jr., and U.S. Pat. No. 4,431,763 to Reed, issued Feb. 14, 1984, which are incorporated herein by reference for the purpose of describing such polymers and methods for preparing them. The polymers can be made by reacting an aqueous dispersion of a tertiary amine-neutralized, isocyanate-terminated urethane prepolymer with triamine-containing polyamine. The isocyanate-terminated urethane prepolymer is formed by the reaction of isocyanate and polyol, at least a portion of the polyol having at least one carboxylic group which is relatively non-reactive with isocyanates. A portion of all of the carboxylic groups of the urea-urethane is neutralized with tertiary amine groups to provide a polymer which can have a relatively neutral pH in an aqueous dispersion, e.g., pH less than about 11. The urea-urethane polymers have an average particle size in the colloidal size range, e.g., less than about 0.1 micrometer, and sufficient tertiary amine-neutralized, carboxylic groups to provide stable, aqueous dispersions having infinite dilutability with water. Monomers used in preparation of Spensol L-51 and Spensol L-54 are reported to include 4,4'-methylene bis(cyclohexylisocyanate), adipic acid, hexanediol, dimethylolpropionic acid and a glycol component which is neopentyl glycol in the case of Spensol L-51 and diethylene glycol in the case of Spensol L-54.

Compositions suitable as a binder component of the invented compositions also include film-forming, water-dispersible, elastomeric acrylic polymer compositions. For some applications these can offer advantages over the urethane polymer compositions discussed above due to greater elasticity of compositions based thereon after curing, softness and flexibility of substrate fabrics printed or coated using such compositions.

Such acrylic polymer compositions typically are water-insoluble but capable of being emulsified with water to form water-dilutable dispersions. The compositions comprise polyacrylate or polymethacrylate compositions prepared from monomers comprising acrylic or methacrylic acid and alcohol by known methods.

Preferred acrylic polymer compositions are those capable of forming air-cured films, that is films cured by circulating air, at about 212°–300° F., having elongations of at least about 300% because the invented compositions based on such binder components have sufficient elasticity to resist cracking due to stretching of substrates coated or printed using the invented compositions. More preferably, such acrylic polymer compositions, in the form of air-cured film, have elongations of about 600% to about 1200% as such binders exhibit excellent elasticity.

Examples of acrylic polymer compositions suitable as a binder component of the invented compositions include elastomeric acrylic polymer latexes designated Elastomeric Latex V-29 and Elastomeric Latex V-43 from the B. F. Goodrich Company, both described by the manufacturer as suitable for pigment loading with pre-dispersed pigments and available as latexes having about 50 wt. % solids content. The former product is described as a water-based, anionic, elastomeric terpolymer latex or emulsion having solids content of 52%, pH of 5.0, surface tension of 42 dynes/cm, Brookfield viscosity of 70 cP and glass transition temperature of −29° C., air-cured, 10 mil films of which have elongations of about 750 to about 1100% when cured at 212°–300° F. The latter composition also is described as an elastomeric terpolymer latex, with total solids content of 50.5%, pH of 8.4, surface tension of 40 dynes/cm, Brookfield viscosity of 200 cP and glass transition temperature of −43° C.

The binder component of the invented compositions can comprise a combination of film-forming, water-dispersible, carboxyl group-containing, elastomeric polymer compositions. For example, a combination of urethane polymer and acrylic polymer compositions as described above is well suited for use when the invented compositions are to be used for coating or printing substrates woven or knit from fine or medium denier, continuous filament or spun yarns, as for example, low denier, air-textured continuous filament yarns used for apparel fabrics. For such applications, the urethane and acrylic polymer compositions preferably are used in a weight ratio of at least about 1 part acrylic polymer composition per part urethane polymer composition to achieve a desirable balance of stretch, mar resistance and lightfastness.

The invented compositions also include a thickener component which functions to increase viscosity thereof to facilitate application to substrates of the compositions in paste from or by spreading. Suitable thickeners for aqueous coating and printing compositions are well known and include various gums, ammonia, ammonium sulfate and various water-soluble or water-dispersible, carboxyl group-containing polymers. Examples include various gums such as that identified as Paragum 109 and polyacrylic acid and polyacrylate salts, such as that designated Printing Concentrate TM 957 Thickener from Morton Thiokol, Inc., which is a polyacrylic acid salt dispersed in Stoddard Solvent, an aliphatic petroleum distillate, and described as having typical solvent content of 26–28%, Brookfield viscosity at 25° C. of 2000–8000 cps, typical pH of 7.5–8.5 and as being dispersible in water, and that designated Cru Thix 46 from Crucible Chemical Company, a 13% solids content, aqueous solution of sodium polyacrylate described as having pH of 9.0 and Brookfield viscosity of 20,000 cps maximum. The latter is a preferred thickener component for use in the invented compositions containing a urethane polymer composition as a binder component, while the polyacrylic acid salt composition is preferred for use when the binder comprises an acrylic polymer composition, due to reactivity of such components.

The invented compositions also comprise a chlorinated polyolefin component. As is known, chlorinated polyolefins adhere to a wide range of substrates, including polypropylene, and are sold as stir-in additives for promoting adhesion of coatings and inks to substrates, including those of polypropylene. In the invented compositions, the chlorinated polyolefin component functions as an adhesion promoter.

Suitable chlorinated polyolefins include known materials and generally comprise one or more chlorinated homo- or copolymer polyolefins having chlorine content of about 15 to about 65 wt. %. The materials typically are commercially available as solutions in aromatic hydrocarbon solvents, for example, 25 or 40 wt. % in xylene or mixed aromatic solvents, e.g. aromatic naphtha, and can be diluted to lower concentrations with such solvents or others such as toluene. Examples of such chlorinated polyolefin components are those designated Chlorinated Polyolefin CP-515-1 and CP-515-2 from Eastman Chemical Products, Inc. which are available as 40 wt. % solutions in xylene or aromatic solvent, identified as Aromatic 100, and described by the manufacturer as having specific gravities at 25°/25° C. of 0.955 and 0.944 and Brookfield viscosities at 25° C. of 80 and 220 cP, respectively.

The polyorganosiloxane component of the invented composition is an organosilicone fluid and functions to improve mar, abrasion and crock resistance of the invented compositions after curing. Preferred polyorganosiloxane components comprise polydialkylsiloxane homo- and copolymer compositions, an example of which is that designated Silicone Fluid Y-9229 from Union Carbide Corporation which is described by the manufacturer as a water-insoluble, organomodified polydimethylsiloxane copolymer boiling at greater than 150° C. and freezing below 0° C. and having specific gravity at 25°/25° C. of 0.98 and vapor pressure at 20° C. below 1 mm mercury.

Water is present in the invented compositions as a dispersant for the binder and other components of the compositions.

Prior to use of the invented compositions for printing and coating, the same also must comprise a crosslinking agent although the compositions preferably are stored and handled with the crosslinking agent absent because shelf life after addition of the same is limited. Suitable crosslinking agents are those capable of causing crosslinking by reaction with carboxyl groups of the binder component. Preferred crosslinking agents for the invented compositions include carbodiimide compounds, an example of which is that designated Crosslinker XL-25 SE from Union Carbide Corporation. This material is described as a 50 wt. % total solids content solution of carbodiimide compound in propylene glycol monomethyl ether acetate having a flash point of 112° F. and suitable for addition directly to most waterborne coating formulations with minimal agitation and useful for improving solvent resistance and durability of waterborne polyurethanes. Polymeric aziridine resins also are known crosslinking agents for urethane polymers and may be included in the invented compositions although use thereof is not preferred.

The invented compositions comprise a dispersion of components as described above in an aqueous medium. Solids content of the dispersion can vary widely and be adjusted depending on various practical considerations such as storage, shipping and end use requirements. Preferably, total solids content of the compositions ranges from about 2 to about 60 wt. %, with about 25 to about 50 wt. % being more preferred when the binder component comprises a urethane polymer composition as described above and about 3 to about 30 wt. % being more preferred when acrylic polymer composition as described above is the binder component. The aqueous, liquid dispersing medium comprises water and may also contain minor amounts, e.g., up to about 25 wt. % based on total liquid, of organic materials such as those that may be present in the various components of the invented composition as used in preparation thereof. Examples of such organic materials include xylenes or mixed aromatic solvents of the type present in the chlorinated polyolefin component, nitrogen-containing organics, such as N-methylpyrrolidone, which may be present in some of the binder components in commercially available form and aliphatic petroleum distillates and deodorized kerosene which may be present in some thickener components. Preferably, water content of the aqueous, liquid dispersing medium is at least about 85 wt. % based on total dispersing medium weight.

Component proportions in the invented compositions can be varied depending on end use and processing requirements. Generally, the binder component is present in an amount effective to form a continuous film on the surface of a substrate to which the compositions are applied after curing of the compositions. When using such compositions as vehicles for colorant compositions, the binder also should be present in an amount effective to achieve suitable dispersion of colorant. The chlorinated polyolefin component is present in an amount effective to promote adhesion of the invented compositions, after curing, to substrates to which they are applied. The polyorganosiloxane component is present in an amount effective to improve mar resistance of the cured compositions without contributing excessive oiliness thereto. Thickener component is used in an amount effective to increase viscosity of the compositions of a level suitable for application thereof to substrates. The amount of crosslinking agent is an amount effective to promote substantial crosslinking of the binder component on curing.

Preferably, binder component solids content in the invented compositions is at about 75 to about 98 wt. % of total solids content to obtain good film-forming characteristics and dispersibility of colorants if used, with about 80 to about 95 wt. % being more preferred. Chlorinated polyolefin component solids content preferably is about 0.5 to about 10 parts by weight per hundred parts by weight binder solids to achieve good adhesion promotion without difficulty in dispersing the component in the invented compositions. Polyorganosiloxane component content preferably ranges from about 2 to about 20 parts by weight per hundred parts by weight binder solids to provide mar and abrasion resistance without oiliness. Thickener component solids content preferably ranges from about 0.5 to about 30 parts by weight per hundred parts by weight of binder solids with precise amounts varying with desired product viscosity. Preferred crosslinking agent solids content ranges from about 1 to about 10 parts by weight per hundred parts by weight binder component solids.

Colorant compositions that can be included in the invented compositions are materials dispersible therein and include a wide range of materials known to the art. Examples include titanium dioxide, a well known white pigment, as well as various organic colorant compositions such as organic colorant dispersions and micronized powders capable of being dispersed in the invented compositions. Specific examples of organic colorant compositions include resin-dispersed pigments such as Flexiverse pigments from Sun Chemical Co. comprising colorants dispersed in acrylic resin compositions and those known as Hi-Fast N pigments from BASF.

Colorants are included in amounts effective to achieve the desired degree of coloration in finished products, with greater amounts producing deeper shades and lesser amounts producing lighter shades. Preferred colorant levels range from about 0.05 to about 5 wt. % based on weight of the dispersion compositions to achieve coloration without reducing resistance to crock in finished products.

Particularly preferred compositions according to the invention are shown in the following table wherein component proportions, in parts by weight per hundred parts by weight of total binder component, are designated "pbw":

| Composition: | 1 | 2 | 3 |
|---|---|---|---|
| Binder Component | Spensol L-56[1] | Elastomeric Latex V-29[5] | Spensol L-56 and Elastomeric Latex V-29 (wt ratio = 1:3 to 1:9) |
| Thickener Component (pbw) | 1-10 Cru Thix 46[2] | 0.5-5 Printing Concentrate 957 Thickener[6] | 1-10 Printing Concentrate 957 Thickener |
| Chlorinated Polyolefin Component (pbw) | 1-7 CP-515-2[3] | 1-5 CP-515-2 | 1-7 CP-515-2 |
| Polyorgano siloxane Component (pbw) | 1-5 Silicone Fluid | 0.1-5 Silicone Fluid Y-9229 | 1-5 Silicone Fluid |

-continued

| Composition: | 1 | 2 | 3 |
|---|---|---|---|
| | Y-9229[4] | | Y-9229 |
| Water (pbw) | | 200–400 | |

(1) aqueous dispersion of fully reacted aliphatic urethane polymer, 35-37 wt. % solids content, in solvent of about 79% water, 19% N-methylpyrrolidone and 2% amine.
(2) aqueous sodium polyacrylate solution, 13% solids content.
(3) 40 wt.% solution of chlorinated polyolefin in Aromatic 100 solvent.
(4) copolymer organosilicone fluid comprising copolymer polydimethylsiloxane.
(5) aqueous-based acrylic polymer latex, 52% solids.
(6) polyacrylic acid salt dispersed in aliphatic petroleum distillate, 26-28% solvent content.

In such compositions, a preferred crosslinking agent is that identified as XL-25 SE, which comprises carbodiimide crosslinking agent as a 50 wt. % solids content solution in propylene glycol monomethyl ether acetate. Preferred levels of crosslinking agent in such compositions are about 1-5 parts per hundred parts by weight of total binder component.

Additives of various types, such as fillers, flame retardants, U.V. stabilizers, levelling agents and anti-bacterial agents may be included in the invented composites if desired.

The invented compositions are prepared by a method comprising combining components comprising the binder and thickener components and water with agitation to form a thickened aqueous dispersion and adding to the thickened dispersion components comprising chlorinated polyolefin and polyorganosiloxane components and, optionally, colorant composition under shear effective to form a substantially uniform aqueous dispersion composition. If desired, colorant composition or additional thickener component or both may be added subsequently to the aqueous dispersion composition. Such later addition can afford flexibility and convenience in printing or coating operations by allowing addition of particular colorants or levels of thickeners tailored to specific end uses to a stock dispersion of the binder, thickener, chlorinated polyolefin and polyorganosiloxane components. Prior to use in printing or coating substrates, crosslinking agent is added to the aqueous dispersion composition under shear. Addition of crosslinking agent is conducted shortly before such use because shelf life of the compositions is limited after addition of crosslinking agent.

In preparing the invented compositions, the components preferably are combined at ambient temperature. Mixing of the binder and thickener components and water is conducted with agitation sufficient to achieve substantially uniform dispersion. Addition of the remaining components is conducted under conditions of high shear to achieve substantially uniform dispersion. Preferably, mixing under high shear is continued for a period of time after the addition is complete. Generally, the time and rate of mixing and shearing can be varied to achieve adequate dispersion at suitable production rates. Conveniently, conditions of high shear are achieved by mixing the components in a mixing device equipped with a high speed impeller and, preferably, with sweep blades or other suitable means for avoiding accumulation of solids on the mixing vessel walls.

The invented compositions are suitable vehicles for colorant compositions as described above and, with and without addition of colorant compositions, suitable for printing and coating, respectively, of substrates after addition of crosslinking agent. Colorant-free coatings of the invented compositions serve as useful stabilizers for fabric substrates. Coating and printing of substrates is conducted by applying the compositions, including crosslinking agent and desired levels of colorant compositions to the substrate and curing the composition.

The invented compositions can be applied to substrates by any suitable technique such as by spreading and other coating and printing techniques. Flat bed screen printing and rotaty printing equipment can be used as can cylinder presses and gravure and flexographic printing equipment. For use in flat bed screen printing and rotary printing, viscosity of the compositions preferably is about 14,000 to about 20,000 CP as higher viscosities can be difficult to apply uniformly while lower viscosities may result in pour coating integrity after curing. Application rates depend on substrate characteristics, number of colors, design and other factors and preferably range from about 0.1 to about 2 ounces per square yard in the case of fabric substrates.

Curing is conducted by heating the substrates with the invented compositions applied thereto to a temperature and for a time effective to achieve reaction of the reactive components of the composition and drive off water and other volatile components and form a continuous film or coating adhering to the substrate in the areas to which the invented compositions have been applied. Generally, heating is conducted at about 165 to about 350° C. for about 15 to about 100 seconds, although curing should not be so severe as to damage the substrate. For printing and coating polypropylene substrates, preferred curing conditions include temperatures of about 165 to about 205° F. for about 20 to about 90 seconds.

Substrates suitable for coating or printing with the invented compositions include natural and synthetic materials such as cotton fabrics, cotton/polyester blends, polyester fabrics and polyolefin fabrics such as polypropylene and polyethylene. The invented compositions are particularly suited for printing and coating polyolefin fabrics, and especially woven, knit and non-woven polypropylene fabrics, for example, fabrics prepared from texturized or nontexturized continuous filament yarns or spun yarns such as are used in manufacture of sporting apparel, softsided luggage and wall coverings. Such fabrics can be woven or knitted from fine, medium or heavy denier yarns. For use in printing fabrics prepared from fine denier yarns, the invented compositions in which the binder component comprises an acrylic polymer composition are preferred. For fabrics prepared from heavier yarns, preferred compositions are those for which the binder is a urethane polymer composition.

The present invention is described further in the following examples, it being understood that the same are for purposes of illustration and not limitation.

EXAMPLE 1

To a Meyers, Dual Action L-550 High Speed Mixer equipped with mixing and sweep blades were added 25 parts by weight of a 52% solids content, acrylic polymer latex identified as Elastomeric Latex V-29 from B. F. Goodrich Company, 75 parts by weight water and 1 part by weight of a polyacrylic acid salt dispersed in aliphatic petroleum distillate having solvent content of 26-28% and identified as Printing Concentrate 957 Thickener from Morton Chemical. These components were sheared at about 2000-3000 rpm for about 5 minutes to form a thickened aqueous dispersion having a milky white appearance. The thickened dispersion was subjected to shear by mixing at 2000–3000 rpm and to the vortex of the sheared dispersion were added 0.075 parts by weight polyorganosiloxane component identified as Silicone Fluid Y-9229 from Union Carbide Corporation, 0.375 parts by weight of a 40 wt. % solution of a chlorinated polyolefin in Aromatic 100 solvent, identified as CP-515-2, 0.25 parts by weight of an acrylic resin-dispersed colorant identified as Flexiverse from Sun Chemical Co. and 0.75 parts by weight carbodiimide crosslinking agent as a 50% solids content solution in propylene glycol monomethyl ether acetate identified as Ucarlink XL-25 SE from Union Carbide Corporation. Shearing was continued for about 15–30 minutes after component addition was completed.

The resulting dispersion was applied to a knitted apparel fabric prepared from untextured, continuous filament polypropylene yarns using a flat bed hand press at an application rate of about 0.1 ounce per square foot, after which the fabric with the dispersion applied thereto was cured in infrared-heated air at about 200° F. for about 45 to about 85 seconds.

Samples of the resulting printed fabric, after curing, were tested for crock according to AATCC No. 8. After 20 cycles with a one pound weight and cotton cloth used for rubbing, the fabric had dry and wet crock ratings of 5 on a scale of 1–5, indicating resistance of the printed fabric to crock and essentially no color ruboff.

Samples of the fabric also were tested for washability by AATCC No. 61 using a Kenmore washing machine with 140° F. water and recommended levels of Tide detergent. After 20 cycles, the samples were rated 5 on a scale of 1–5, indicating essentially no loss of color due to washing.

EXAMPLE 2

Following generally the procedure of EXAMPLE 1, a thickened dispersion was prepared from 100 parts by weight of a 35–37 wt % solids content dispersion of fully reacted aliphatic, elastomeric urethane polymer composition in a solvent mixture of 79% water, 19% N-methylpyrrolidone and 2% amine, identified as Spensol L-56 from Spencer Kellogg, and 3 parts by weight of a 13% solids content, aqueous solution of sodium polyacrylate identified as Cru Thix 46 from Crucible Chemical Company. To the vortex of the sheared, thickened dispersion were added 2 parts by weight of the polyorganosiloxane used in EXAMPLE 1, 3 parts by weight of the chlorinated polyolefin solution used in EXAMPLE 1, 1 part by weight of the colorant used in EXAMPLE 1, and 3 parts by weight of the carbodiimide solution used in EXAMPLE 1. The resulting dispersion was then used to print a wall cover fabric woven from bulked continuous filament polypropylene warp yarns and spun polypropylene fill yarns by rotary screen printing. Curing was conducted in a gas-fired oven at about 185° F. for about 60 seconds.

The resulting printed fabric was tested for crock as in EXAMPLE 1 and was rated 5 for both wet and dry crock.

Samples also were tested for abrasion according to ASTM D-4157 at two pounds pressure and two pounds tension using a Wyzenbeek device and cotton duck fabric as an abrader. The samples were rated Heavy, indicating no noticeable wear.

Samples of the fabric also were tested using a 2500 watt Carbon Arc Weatherometer. Water was periodically sprayed on the fabric during exposure. At 50 hours, samples showed no noticeable change, at 75 hours they exhibited noticeable change and at 150 hours there was radical changes.

Testing of the fabric using a Fadeometer with a 6500 watt Xenon bulb showed no noticeable change at 100 and 250 hours, and minimal change, corresponding to a color loss of no more than 5% on the AATCC color scale, after 545 hours.

Fabric samples also were stained with each of ketchup, mustard, cherry Kool-Aid, lipstick, chocolate syrup and crayon and then washed with various cleaners including undiluted Clorox bleach, undiluted white vinegar, 409 cleaner and Parson's Sudys Ammonia. In all tests, the stains washed off leaving the printed areas unaffected.

EXAMPLE 3

Following generally the procedure of EXAMPLE 1, an aqueous dispersion composition was prepared from 20 and 80 parts by weight, respectively, of the urethane and acrylic polymer-based binder components used in EXAMPLES 1 and 2, 2.6 parts by weight of the thickener component used in EXAMPLE 1, 1.5 parts by weight of the polyorganosiloxane component used in EXAMPLE 1, 2 parts by weight of the chlorinated polyolefin component used in EXAMPLE 1, 1 part by weight of the colorant used in EXAMPLE 1 and 3 parts by weight of the crosslinking agent used in EXAMPLE 1.

The composition was used to print a stretch apparel fabric knit from 90% fine denier polypropylene yarns and 10% Lycra yarns. Printing and curing were conducted essentially as in EXAMPLE 1.

Washability testing according to AATCC No. 61 as in EXAMPLE 1 gave a rating of 4 indicating good color retention.

I claim:

1. An aqueous dispersion composition consisting essentially of an aqueous dispersion of a binder component consisting of a film-forming, water-dispersible, carboxyl group-containing, elastomeric acrylic polymer composition; a thickener component; a chlorinated polyolefin component having solids content of about 0.5 to about 10 parts by weight per hundred parts by weight binder solids; a polyorganosiloxane component; and water.

2. An aqueous dispersion composition consisting essentially of the composition of claim 1 and a crosslinking agent.

3. An aqueous dispersion composition consisting essentially of the composition of claim 2 and a colorant composition.

4. The composition of claim 2 wherein the crosslinking agent comprises a carbodiimide compound.

5. An aqueous dispersion composition consisting essentially of the composition of claim 1 and a colorant composition.

6. The composition of claim 1 wherein the polyorganosiloxane component comprises a polydimethylsiloxane.

7. The composition of claim 1 wherein the thickener component comprises at least one water-soluble or water-dispersible, carboxyl group-containing polymer composition.

8. The composition of claim 7 wherein the carboxyl group-containing polymer composition comprises at least one polyacrylic acid salt or polyacrylate salt.

9. A method for preparing an aqueous dispersion composition comprising mixing components consisting essentially of a binder component consisting of a film-forming, water dispersible, carboxyl group-containing, elastomeric acrylic polymer composition, a thickener component and water to form a thickened aqueous dispersion and adding to the thickened dispersion components consisting essentially of a chlorinated polyolefin component having solids content of about 0.5 to about 10 parts by weight per hundred parts by weight binder solids and a polyorganosiloxane component under shear effective to form a substantially uniform aqueous dispersion composition.

10. The method of claim 9 wherein the components added to the thickened dispersion consist essentially of the chlorinated polyolefin component, the polyorganosiloxane component and at least one colorant composition.

11. The method of claim 10 wherein the components added to the thickened dispersion consist essentially of the chlorinated polyolefin component, the polyorganosiloxane, the colorant composition and at least one crosslinking agent.

12. The method of claim 9 wherein the components added to the thickened dispersion consist essentially of the chlorinated polyolefin component, the polyorganosiloxane and at least one crosslinking agent.

13. The method of claim 9 wherein the thickener component comprises a solution or dispersion of at least one polyacrylic acid salt or polyacrylate salt in an organic or aqueous medium.

14. The method of claim 13 wherein the thickener component comprises an aqueous solution of sodium polyacrylate.

15. The method of claim 13 wherein the thickener component comprises a polyacrylic acid salt dispersed in an aliphatic petroleum distillate.

16. The method of claim 9 wherein the chlorinated polyolefin component comprises a solution of chlorinated polyolefin in an aromatic solvent.

17. The method of claim 9 wherein the polyorganosiloxane component comprises a polydimethylsiloxane composition.

18. The method of claim 12 wherein the crosslinking agent comprises a carbodiimide compound dissolved in propylene glycol momomethyl ether acetate.

19. A method for printing or coating a substrate comprising applying to a polyolefin substrate an aqueous dispersion composition consisting essentially of an aqueous dispersion of a binder component consisting of a film-forming, water dispersible, carboxyl group-containing, elastomeric acrylic polymer composition, a thickener component, a chlorinated polyolefin component consisting of a chlorinated polyolefin and an aromatic hydrocarbon solvent therefor wherein the chlorinated polyolefin consists essentially of at least one chlorinated homopolymer or copolymer polyolefin and has solids content of about 0.5 to about 10 parts by weight per hundred parts by weight binder solids, a polyorganosiloxane component, a crosslinking agent and water; and curing the aqueous dispersion composition.

20. The method of claim 19 wherein the substrate is a polyolefin fabric.

21. The method of claim 20 wherein the polyolefin fabric is a polypropylene fabric.

22. The method of claim 21 wherein the polypropylene fabric is a woven polypropylene fabric.

23. A printed or coated fabric produced by the method of claim 19.

24. A printed or coated fabric prepared by the method of claim 20.

25. A printed or coated fabric prepared by the method of claim 21.

26. A printed or coated fabric prepared by the method of claim 22.

27. A method for printing or coating a substrate comprising applying to a polyolefin substrate a colored aqueous dispersion composition consisting essentially of the aqueous dispersion composition according to claim 27 and at least one colorant composition and curing the colored aqueous dispersion composition.

28. The method of claim 19 wherein the crosslinking agent comprises a carbodiimide compound.

29. The method of claim 21 wherein the polyorganosiloxane component comprises a polydimethylsiloxane.

30. The method of claim 21 wherein the thickener component comprises at least one water-soluble or water-dispersible, carboxyl group-containing polymer composition.

31. The method of claim 30 wherein the carboxyl group-containing polymer composition comprises at least one polyacrylic acid salt or polyacrylate salt.

32. The composition of claim 1 wherein the chlorinated polyolefin component comprises a solution of chlorinated polyolefin in an aromatic solvent.

33. The method of claim 9 wherein the chlorinated polyolefin component comprises a solution of chlorinated polyolefin in an aromatic solvent.

* * * * *